United States Patent

Schwarzenberg et al.

(10) Patent No.: US 11,106,940 B2
(45) Date of Patent: Aug. 31, 2021

(54) TRAINING OF A CLASSIFIER

(71) Applicant: Robert Bosch GmbH, Stuttgart (DE)

(72) Inventors: Gregor Schwarzenberg, Calw (DE); Hendrik Kurre, Stuttgart (DE); Johannes-Joerg Rueger, Ludwigsburg (DE); Udo Schulz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 16/406,709

(22) Filed: May 8, 2019

(65) Prior Publication Data

US 2019/0354803 A1 Nov. 21, 2019

(30) Foreign Application Priority Data

May 18, 2018 (DE) .......................... 102018207923.4

(51) Int. Cl.
*G06K 9/62* (2006.01)
*G06K 9/00* (2006.01)
*B60R 11/04* (2006.01)

(52) U.S. Cl.
CPC ....... *G06K 9/6256* (2013.01); *G06K 9/00624* (2013.01); *G06K 9/6262* (2013.01); *B60R 11/04* (2013.01)

(58) Field of Classification Search
CPC ............. G06K 9/6256; G06K 9/00624; G06K 9/6262; B60R 11/04

USPC .......................................................... 382/103
See application file for complete search history.

(56) References Cited

U.S. PATENT DOCUMENTS

| 10,169,678 | B1* | 1/2019 | Sachdeva | G05D 1/0221 |
| 2014/0270381 | A1* | 9/2014 | Wu | G06K 9/6267 382/104 |
| 2016/0275376 | A1* | 9/2016 | Kant | G06K 9/209 |
| 2018/0348780 | A1* | 12/2018 | Zheng | G05D 1/0293 |
| 2018/0365888 | A1* | 12/2018 | Satzoda | G06N 3/0454 |
| 2019/0188495 | A1* | 6/2019 | Zhao | G06K 9/66 |

* cited by examiner

*Primary Examiner* — Michael R Neff
(74) *Attorney, Agent, or Firm* — Norton Rose Fulbright US LLP; Gerard A. Messina

(57) ABSTRACT

A method and a device for improved training of a classifier. For this purpose, the device for detecting an object has a first image recording device, which is situated in a first position for recording the object from a first perspective. The device furthermore has a stored first classifier, which is configured to detect the object based on the recorded first perspective. At least one second image recording device is situated in a second position for recording the object from a second perspective, which differs from the first perspective. Furthermore, a data processing device is configured to detect the object recorded by the first image recording device based on the first classifier and to assign to the second perspective a class predetermined by the first classifier. This makes it possible to expand the existing classifier to include the detection of the object from different additional perspectives.

16 Claims, 3 Drawing Sheets

TRAINING OF A CLASSIFIER

RELATED APPLICATION INFORMATION

The present application claims priority to and the benefit of German patent application no. 10 2018 207 923.4, which was filed in Germany on May 18, 2018, the disclosure which is incorporated herein by reference.

FIELD OF THE INVENTION

The present invention relates generally to the field of artificial intelligence. In particular, the present invention relates to a method for training an artificial intelligence module, AI module, and a device for detecting an object and/or a situation.

BACKGROUND INFORMATION

There are numerous technical applications in which objects and/or situations are to be detected automatically, that is to say, in particular, in a manner that is automated by a data processing device. This frequently occurs by way of feature detection or pattern detection, which is of great importance in particular in the field of artificial intelligence. Exemplary applications are found e.g. in the keyword-like search for images in Internet search engines, in the use of robots or also in automotive technology, where computer-assisted driver assistance systems or autonomously driving vehicles require reliable object detection so as to be able to move the vehicle safely through traffic.

Various classification methods, which are also called classifiers, may be used for detecting objects. Such a classifier is often trained using great quantities of training data in order thus to develop bit by bit a detection capability for an object to be detected. Normally, however, the detection capability of such classifiers is limited to the image information of the preceding training data, which results in a markedly limited detection capability especially when there is a change in the perspective from which the image is recorded. That is to say that the classifiers, often trained and secured with great effort, can only be used for specific applications. As a result, new training data must be produced for new applications and the classifier must be trained again using these new training data.

BACKGROUND INFORMATION

It is therefore an objective of the present invention to create a possibility of adapting an existing classifier to a new application.

This objective is achieved by a method for training a new artificial intelligence module, AI module in short, as well as a device for detecting an object according to the independent and coordinated claims. Advantageous developments of the present invention result from the dependent claims, the description and the accompanying figures.

The method provided is suitable for training an AI module, which may be for example a software module for a data processing device, a computer-assisted control device of a motor vehicle, etc. The AI module may be configured to produce an output for a control unit of the motor vehicle for example and to provide it to the latter, which control unit is able to ascertain for example an evasive maneuver and/or a braking maneuver on the basis of the output. The control unit may furthermore prompt the motor vehicle to perform this evasive maneuver and/or braking maneuver by controlling actuators or the like. For this purpose, the AI module may comprise program code and also in particular multilayered and/or folding artificial neural networks (ANN).

The method according to the present invention may be implemented in a computer-assisted manner in e.g. a data processing device having at least one memory unit and one processing unit and comprises the following steps:

First an object to be detected by the AI module is recorded from a first perspective by a first image recording device that is situated in a first position. The object may be for example a traffic sign, a person, a vehicle, a static object such as a house, a tree, a road marking or the like, in road traffic. The image recording device may be a camera, possibly of a driver assistance system. The first position may be in or on a vehicle, it being possible for the first perspective to correspond to a direction of view of the first image recording device from the first position onto the object to be detected.

A first classifier is then provided that is configured to detect the object on the basis of the recorded first perspective. A classifier may be understood as a function, e.g. an algorithm implemented in program code, which assigns an object to a class on the basis of its feature vector. Accordingly, a classification may be understood as a process or a method by which objects may be divided into classes or categories. To set up the first classifier for detection, the classifier may have been trained previously using a set of training data that are made up e.g. of an image-label pair recorded from the first perspective.

According to the invention, the object to be detected is then detected on the basis of the recorded first perspective by the first classifier that is configured for this purpose or is trained for detecting the object.

Previously, simultaneously or afterwards, the object is additionally recorded from at least one second perspective, differing from the first perspective, by a second image recording device that is situated in a second position. The second image recording device may likewise be a camera that records the object to be detected from another perspective or direction of view. One or multiple images may be recorded and possibly stored in the process. Furthermore, n image recording devices for recording the object from n different perspectives may be provided.

The second perspective, e.g. an image recorded from this perspective, is then assigned a label, which is obtained from the detection of the object by the first classifier. A label in this connection may be understood as a categorizing identifier or a machine-readable designation for a class membership for the training data in machine learning.

Using this method, it is possible to achieve at once multiple advantageous effects. Thus it is possible for example to expand the detection capability of the existing first classifier by a comparatively small computing expenditure in such a way that it is able to detect one and the same object not only from the previously trained first perspective, but also from a perspective differing from it, that is, from the second perspective. This makes it possible to detect the object in a more reliable or robust fashion in serial or productive application, that is, e.g., in the operation of a search engine or an autonomously driving vehicle. It is also possible to expand the field application of the classifier markedly. In automotive technology, the classifier expanded in this manner may consequently be used for detecting objects from different types of vehicles so that it is no longer necessary to ensure a uniform first position of the first recording device. For example, in this manner it is possible to expand a classifier trained for a passenger car for use in an agricultural machine that differs markedly in terms of construction type, such as a tractor for example, in that the first image recording device, at least during the implementation of the method described here, is situated in a first position that corresponds to the first position of the passenger car. In the serial or productive use of the agricultural machine, it is then possible to situate the, e.g. even sole, image recording device in a position corresponding to the second position, it being possible to detect the object also from this position due to the expansion of the detection capability of the classifier.

One advantageous development of the present invention provides for the label to include a class of the object that is already known to the first classifier. The class may be e.g.: person, animal, plant, obstacle, road marking, traffic sign, etc. This makes it possible to provide the classifier with a meaningful training data set that also contains the matching class in addition to an image of the object.

In order to be able to expand the classifier by machine learning, it is possible to produce a training data set for the AI module from the image recorded from the second perspective together with the associated label. The training data set may thus contain at least one image-label pair, which is supplied e.g. to an input layer of an ANN of the AI module as input variable. This makes it possible to expand the detection capability of the classifier using comparatively little effort.

So as not to have to enter or record every image-label pair or every training data set by using e.g. a vehicle, it may be advantageous to produce or reconstruct a 3D model of the object using the perspectives recorded by several of the image recording devices, from which subsequently further images of the object from different perspectives are produced or reconstructed. In this manner, in a single recording by the multiple image recording devices, it is possible to digitize the object in such a way that—similarly as in the usual derivation of a 2D drawing from a CAD 3D model—any perspective may be generated in a computer-assisted manner independently of the second image recording device, which perspective differs from the already trained first perspective. In other words, in this manner it is possible to produce an offline expansion of the classifier on the basis of a 3D model of the object to be detected. It is thus possible to change the viewing angles onto the object with great h variability within a short time, for example even in the angular minute range. This makes it possible to reduce significantly the training effort once more, while nevertheless improving the detection capability due to a good quality of the training data.

It may be furthermore advantageous if each additional image of the object generated from the 3D model has assigned to it the label, that is, e.g., a predefined class assigned to the object, and if this is used to produce a training data set for the AI module. This makes it possible to generate training data sets of high quality for the AI module in a quick and simple manner.

As an alternative or in addition to the offline training, the labels may also be assigned during the ongoing operation of the AI module and/or of the image recording devices, that is, online. For this purpose, to illustrate, the first image recording device may label or designate the object for the second image recording device, which allows for an online detection of the object at low computing expenditure.

Another development of the present invention provides for assigning to an image recorded from the second perspective additionally one or multiple optically perceptible features of the object obtained from the first perspective. The features of the object may be generic, e.g., a color, a geometry or contour, a rough texture or the like. With this additional information, the second or even further image recording devices generally may enable the AI module to detect the potentially unknown object from their perspective.

In this regard, it has proved to be particularly advantageous if the one or the multiple features of the object are obtained from a region of overlap of the first and second perspectives. An overlapping region in this context may be understood as a pictorially recorded section of the object that is recorded both by the first as well as by the second image recording device, that is, that the image of the one image recording device may also be found in sections in the image of the other image recording device.

It is not necessary, however, to expand the stored first classifier. Rather, for detecting the object from the second perspective, it is possible to produce a second classifier. This makes it possible for example to keep the data size of the first classifier small. In this manner, it is also possible to store specific classifiers for specific applications.

The present invention also relates to a device for detecting an object or for training an AI module, the device being suitable in particular for implementing the method described above and being capable of being developed accordingly as described above for the method. Conversely, it is also possible to develop the method according to the description below. The device includes:
  a first image recording device, e.g. a camera, which is situated in a first position for recording the object from a first perspective.
  a stored first classifier which is configured to detect the object on the basis of the recorded first perspective.
  According to the present invention, the device also has at least one second image recording device, which is situated in a second position for recording the object from a second perspective that differs from the first perspective.
  a data processing device, e.g., having a processor, memory, etc., which is configured, e.g. is trained, to detect the object recorded by the first image recording device on the basis of the first classifier and to assign to the second perspective a class predetermined by the first classifier.

This configuration of the device makes it possible to achieve in principle the advantages explained for the method described above. Thus it is possible in particular to expand the detection capability of an existing classifier in a simple manner for new applications.

One development of the present invention provides for the first and the second positions to be geometrically coordinated with each other, and for the first image recording device and the second image recording device to be connected to each other for exchanging data. In other words, the two image recording devices may be calibrated to one another.

The first and second positions of the image recording devices may furthermore differ from one another in particular by a height and/or by an angle with respect to the object. In other words, the one image recording device may be situated in a higher or in a lower position with respect to a vertical axis of the vehicle and/or, with respect to a horizontal axis of the vehicle, may be situated in a position further inward or further outward.

In order to be able to provide in addition to the second perspective further optically perceptible features of the object, the first and second perspectives may overlap in a common overlapping region.

Further measures improving the present invention are presented in greater detail below with reference to the figures together with the description of exemplary embodiments of the present invention.

In the following, exemplary embodiments of the present invention are described in detail with reference to the accompanying figures.

The figures are only schematic and not drawn true to scale. In the figures, identical elements, elements acting in the same manner or similar elements have been provided with the same reference numerals throughout.

DETAILED DESCRIPTION

Figure 1:
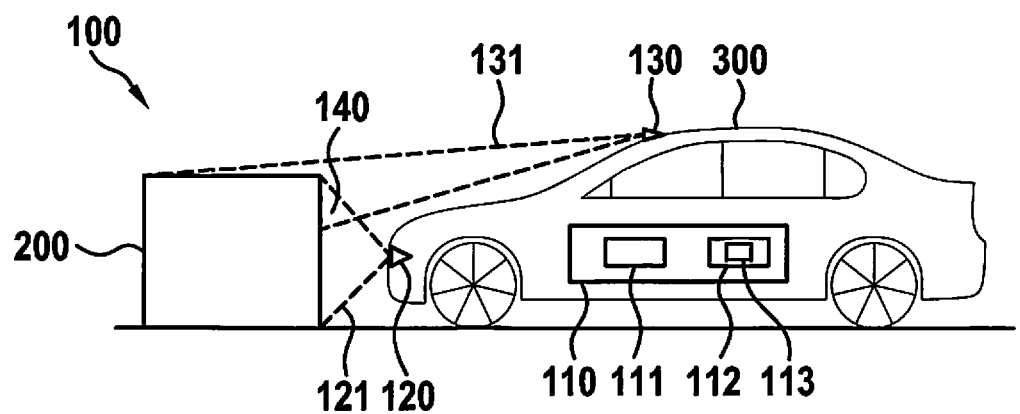
FIG. 1 a device for detecting an object according to an exemplary embodiment of the invention, FIG. 2 a block diagram of a device for detecting an object according to an exemplary embodiment of the invention, FIG. 3 a block diagram of a device for detecting an object according to an another exemplary embodiment of the invention, FIG. 4 a device for detecting an object according to another exemplary embodiment of the invention and FIG. 5 a flow chart for a method of the present invention for training an artificial intelligence module according a an exemplary embodiment of the invention.

FIG. 1 shows a device 100 for detecting an object 200 according to one exemplary embodiment, device 100 here being integrated into a vehicle 300 by way of example. In exemplary fashion, vehicle 300 is here developed as a motor vehicle in the form of a passenger car.

Device 100 has a data processing device 110 in the form of an artificial intelligence module having a processor 111 and a memory 112 for storing a program code to be processed by processor 111, the program code comprising at least one first classifier 113. Device 100 furthermore comprises a first image recording device 120 in the form of a camera, which is situated in a first position for recording object 200 from a first perspective 121 and is coupled to data processing device 110. The first position is here by way of example approximately at the height of a headlight of motor vehicle 300 so that first perspective 121 records object 200 frontally in relation to motor vehicle 300. It should be noted that first classifier 113 was trained from first perspective 121, that is, it is already set up to detect object 200 from this first perspective 121. Classifier 113 is therefore able to classify object 200, that is, to assign it to a particular class of objects.

Figure 2:
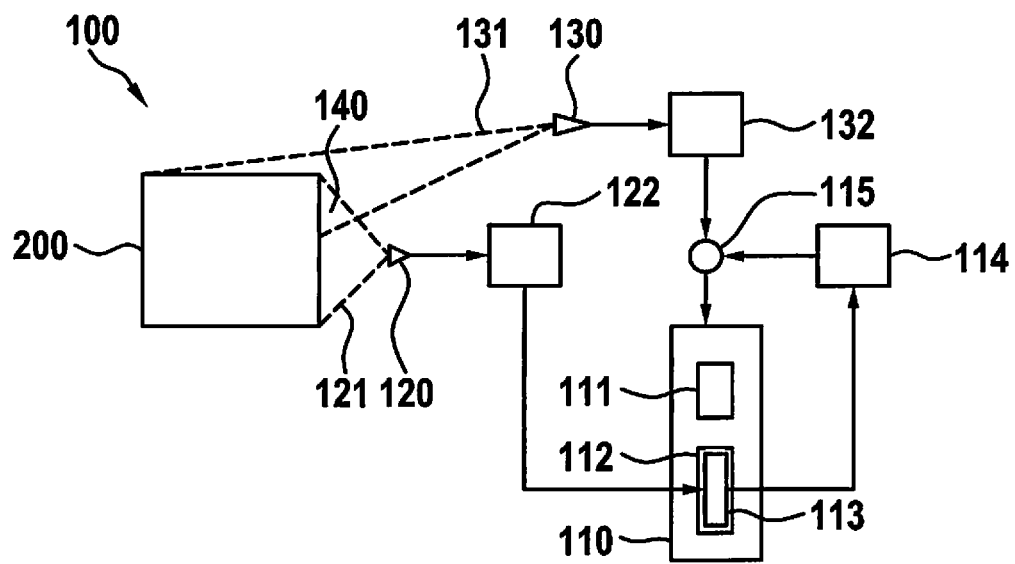

Furthermore, device 100 also has a second image recording device 130 that is situated in a second position for recording the same object 200 from a second perspective 131 differing from first perspective 121 and that is coupled to data processing device 110. In this exemplary embodiment, the second position is located in the area of a vehicle roof of motor vehicle 300, that is, in the direction of a vertical axis of the vehicle, above the first position of first image recording device 120. Accordingly, second image recording device 130 records object 200 from a different height as well as at a different angle, which in this exemplary embodiment corresponds to a recording at an angle from above. By contrast, only a comparatively small section of object 200 is recorded frontally so that the second image recording device is here by way of example not able to provide an image of object 200 that would suffice for a reliable detection of object 200. As indicated in FIG. 1, however, first perspective 121 and second perspective 131 have a common overlapping region 140, which is situated here in exemplary fashion at a front of object 200 relative to motor vehicle 300. With reference to FIG. 2, which shows device 100 as a block diagram, the functional interaction of first image recording device 120 and second image recording device 130 by using first classifier 113 is now functionally explained.

First classifier 113 is accordingly a functional part of data processing device 110 and is—as mentioned above—able, as a result of training using a number of training data sets, to detect object 200 on the basis of the first perspective 121 of object 200 recorded in an image 122 by first image recording device 120 and to assign to it a related class in the form of a label 114 suitable for machine learning, that is, to detect object 200 e.g. as another motor vehicle. Data processing device 110 is furthermore configured to assign label 114 to the second perspective 131 recorded in an image 132 by second image recording device 130, which is indicated in exemplary fashion in FIG. 2 by a data link 115. In this exemplary embodiment, data link 115, which is made up of one or more images 132 of second perspective 131 and label 114 containing the class, is supplied to data processing device 110. Accordingly, as an image-label pair, data link 115 forms a training data set for the data processing device 110 developed as an AI module.

Figure 3:
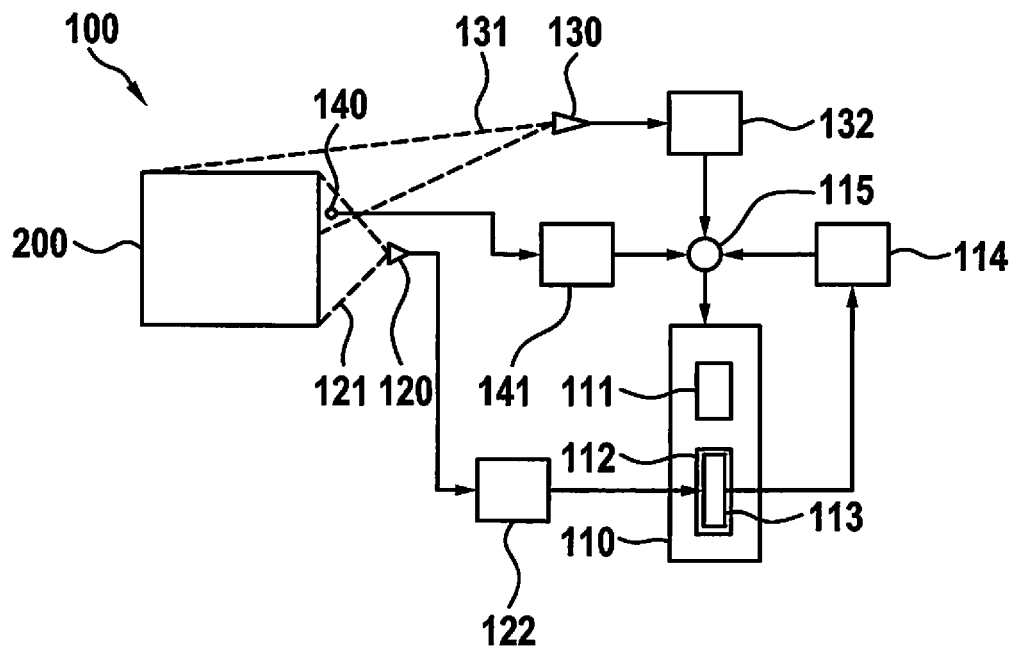

FIG. 3 shows device 100 in another exemplary embodiment, in which for the further improvement of the detection capability of first classifier 113 additionally characteristic features 141 of object 200 from overlapping region 140 of the two perspectives 121, 131 are also linked in data link 115. Features 141 are here e.g. a color of object 200, its geometry and/or its rough texture or form.

Figure 4:
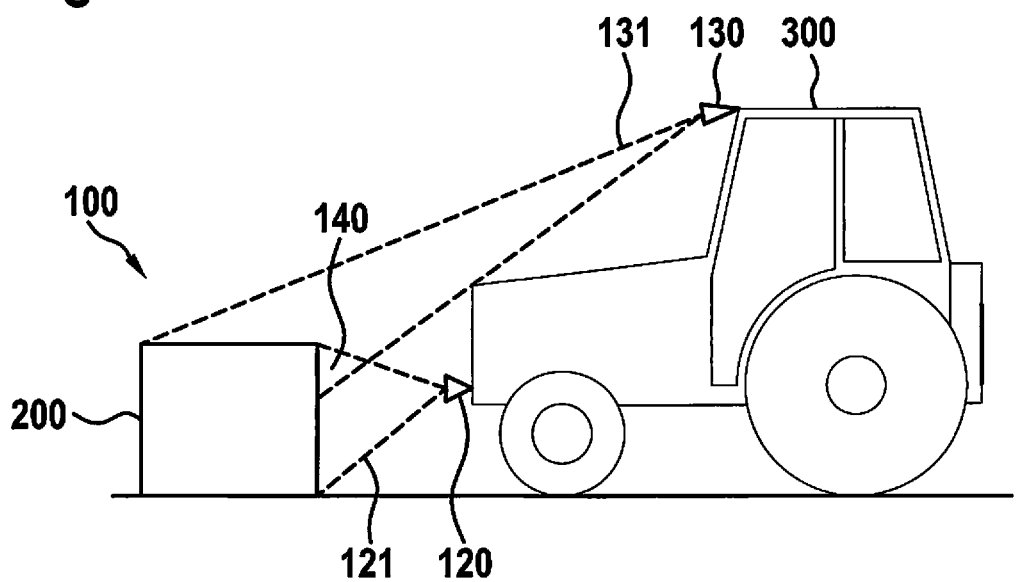

FIG. 4 shows a further exemplary embodiment, in which vehicle 300 is now developed as an agricultural machine. An advantageous application of device 100 will now be explained on the basis of this exemplary embodiment. Device 100 of this exemplary embodiment is essentially identical to device 100 from the previously explained exemplary embodiment, with the difference that additionally n second image recording devices 130 are situated on agricultural machine 300 having additional n different second perspectives 131.

Agricultural machine 300 deviates in its construction type, in particular in its construction size, substantially from a passenger car so that the classifier 113 trained for the above-described motor vehicle cannot be readily used for agricultural machine 300. For, as a result of the deviating construction type, the recordable perspectives of image recording devices 120, 130 differ substantially from those described above for the passenger car so that object 200 cannot be readily detected.

Device 100 of this exemplary embodiment is therefore again configured to use first image recording device 120 to detect object 200, for the purpose of which first image recording device 120 is situated approximately in a first position, e.g. by an auxiliary holding device or the like, which approximately corresponds to the first position of vehicle 300 developed as a passenger car from the previously described exemplary embodiment.

In order to expand the detection capability of classifier 113, data processing device 110 produces—as explained with reference to FIGS. 2 and 3—a data link 115 from the nth image 122 of each nth second image recording device 130 for the respectively (n+1)th second image recording device 130. This is carried out as in a cascade for all additional (n+1)th second image recording devices 130, as described above, in order to expand the first classifier 113 in such a way that it ensures a detection of object 200 for all additional n second image recording devices 130.

Figure 5:
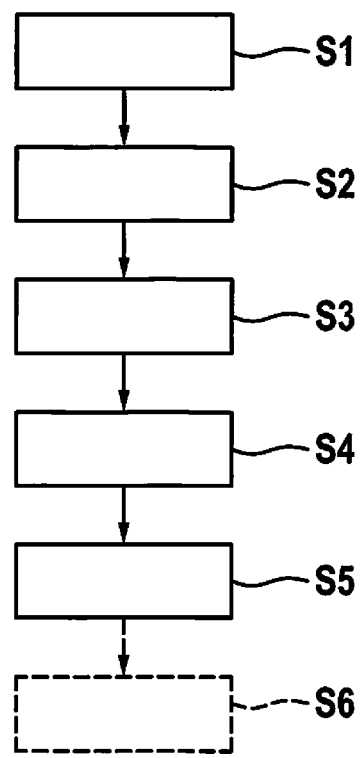

FIG. 5 shows a flow chart of a method of the present invention of the data processing device 110 developed as an AI module, the method being carried out using device 100.

In a first step S1, object 200 is recorded from first perspective 121 by first image recording device 120, which is situated in the first position. In a step S2, first classifier 113 is provided, it being configured or trained for detecting object 200 and for assigning the same to a predetermined class. In a step S3, object 200 is then detected in a step S3 by first classifier 113 on the basis of the recorded first perspective 121. E.g., afterwards, in a step S4, object 200 is recorded from a second perspective 131 that differs from first perspective 121 by the second image recording device 130, which is situated in the second position. In a step S5, the label 114 obtained from the detection of object 200 by first classifier 113 is then assigned to second perspective 131. In an optional step S6, a training data set is produced for the AI module 110 from label 114 and second image 132 from second perspective 131 and is supplied to AI module 110. The method may be expanded in accordance with the functioning method of data processing device 110 explained with reference to FIGS. 2 and 3.

Starting from the exemplary embodiments shown, the device 100 of the invention and the method of the invention may be modified in many respects. For example, instead of expanding first classifier 113, it is also possible to produce a second or even multiple additional classifiers, which may then be e.g. specific for the second or even for multiple additional perspectives.

What is claimed is:

1. A method for training an artificial intelligence (AI) module, the method comprising:
   recording a first image of an object from a first perspective by a first image recording device, which is situated in a first position;
   providing a first classifier to detect the object based on the recorded first image from the first perspective;
   detecting the object by the first classifier based on the recorded first image from the first perspective;
   recording a second image of the object from at least a second perspective, which differs from the first perspective, using a second image recording device, which is situated in a second position;
   assigning a label, obtained from the detection of the object by the first classifier based on the recorded first image from the first perspective, to the second image from the second perspective; and
   producing a training data set for the AI module having an image-label pair including the second image recorded from the second perspective together with the assigned label.

2. The method of claim 1, wherein the label contains a class of the object that is previously known to the first classifier.

3. The method of claim 1, wherein using the perspectives recorded by several of the image recording devices, a 3D model of the object is produced from which then further images of the object are produced from different perspectives.

4. The method of claim 3, wherein the label is assigned to every additionally generated image of the object and a data training set for the AI module is produced therefrom.

5. The method of claim 1, wherein the assignment of the label is performed during the running operation of the AI module and/or of the image recording devices.

6. The method of claim 1, wherein an image recorded from the second perspective is additionally assigned at least one optically perceptible feature of the object received from the first perspective.

7. The method of claim 6, wherein the at least one feature of the object is obtained from an overlapping region of the first perspective and the second perspective.

8. The method of claim 1, wherein a second classifier is produced for the detection from the second perspective.

9. The method of claim 1, wherein the first position and the second position of the image recording devices differ from one another by a height with respect to the object.

10. The method of claim 1, further comprising training the first classifier using the produced training data set having the image-label pair including the second image recorded from the second perspective together with the assigned label.

11. A device for detecting an object, comprising:
    a first image recording device, which is situated in a first position for recording a first image of the object from a first perspective;
    a stored first classifier to detect the object based on the recorded first image from the first perspective;
    at least one second image recording device, which is situated in a second position for recording a second image of the object from a second perspective, which differs from the first perspective; and
    a data processing device to detect the object recorded by the first image recording device based on the first classifier and to assign to the second image from the second perspective a class predetermined by the first classifier based on the recorded first image from the first perspective, and produce a training data set for an AI module having an image-label pair including the second image recorded from the second perspective together with the assigned label.

12. The device of claim 11, wherein the first position and the second position are geometrically coordinated with each another, and the first image recording device and the second image recording device are connected to each other for exchanging data.

13. The device of claim 11, wherein the first position and the second position of the image recording devices differ from one another.

14. The device of claim 11, wherein the first perspective and the second perspective overlap each other in an overlapping region.

15. The device of claim 11, wherein the first position and the second position of the image recording devices differ from one another by a height with respect to the object.

16. The device of claim 11, wherein the first position and the second position of the image recording devices differ from one another by an angle with respect to the object.

* * * * *